J. KOCHANOWSKI.
LAMP ADJUSTING MECHANISM.
APPLICATION FILED MAR. 20, 1912.
1,085,141.
Patented Jan. 27, 1914.
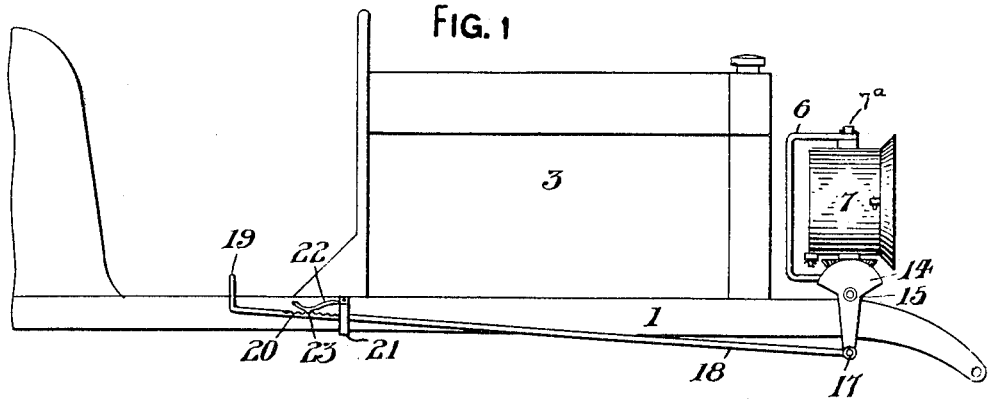
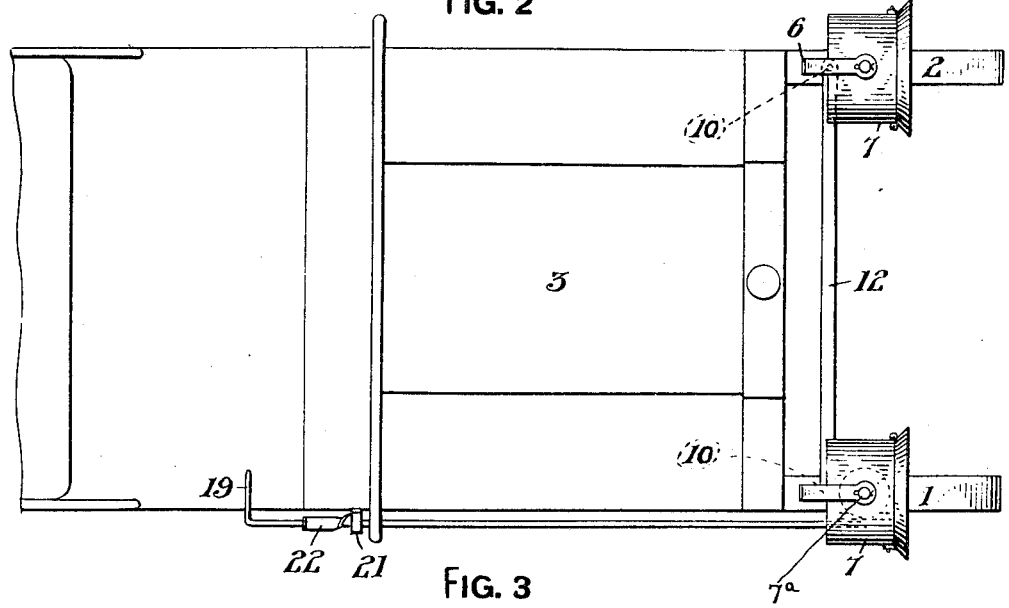
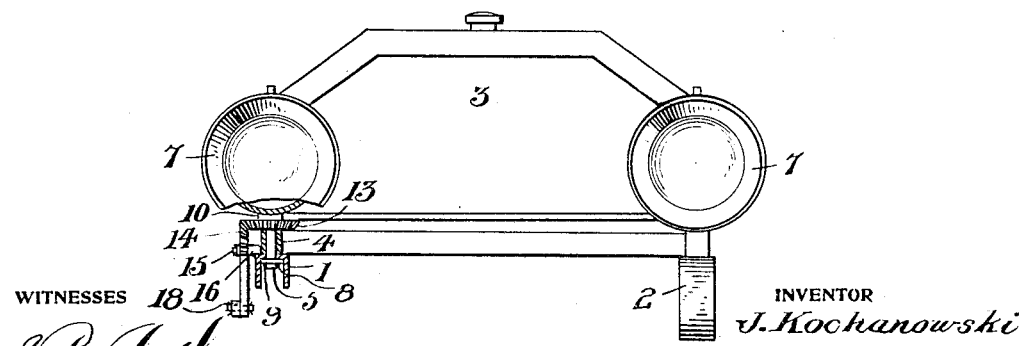
WITNESSES
J. P. Appleman
Ralph C. Evert.
INVENTOR
J. Kochanowski
BY
ATTORNEYS

UNITED STATES PATENT OFFICE.

JOHN KOCHANOWSKI, OF ELIZABETH, PENNSYLVANIA.

LAMP-ADJUSTING MECHANISM.

1,085,141. Specification of Letters Patent. Patented Jan. 27, 1914.

Application filed March 20, 1912. Serial No. 685,064.

*To all whom it may concern:*

Be it known that I, JOHN KOCHANOWSKI, a citizen of the United States of America, residing at Elizabeth, in the county of Allegheny and State of Pennsylvania, have invented certain new and useful Improvements in Lamp-Adjusting Mechanism, of which the following is a specification, reference being had therein to the accompanying drawing.

This invention relates to an adjusting mechanism for the lamps of automobiles, and the object of my invention is the provision of simple and effective means, in a manner as will be hereinafter set forth, whereby the lamps or lanterns of an automobile or similar vehicle can be easily shifted by the driver or operator of the vehicle.

My invention aims to provide a lamp shifting mechanism that is applicable to various types of vehicles, the mechanism being arranged to permit of the lamps or lanterns being shifted to cast the rays of light in the direction in which the forward wheels of the vehicle are traveling. It is in this connection that the mechanism is especially applicable to automobiles, as it is a well known fact that with the present type of lamp or lantern holders, the rays of light are not cast in the path of the forward wheels of the automobile, when the automobile is passing around a curve or the corner of intersecting streets. To this end, I have devised a durable mechanism that can be adjusted by hand or foot to shift the lamps or lanterns whereby the rays of light will be cast in the direction in which the forward wheels of the machine are being steered. The mechanism is entirely independent of the steering mechanism or the trucks of the vehicle, consequently the adjusting mechanism is not subjected to any wear or tear due to vibrations of the trucks.

The invention will be hereinafter specifically described and then claimed, and reference will now be had to the drawing, wherein:—

Figure 1 is a side elevation of a portion of an automobile provided with the lamp adjusting mechanism, Fig. 2 is a plan of the same, and Fig. 3 is a front elevation, showing the adjusting mechanism partly broken away and partly in section.

The reference numerals 1 and 2 denote the side frames of an automobile 3, said frames having vertical bearings 4 for the depending stems 5 of lamp or lantern holders 6, said holders supporting lamps or lanterns 7. The depending stems 5 are retained in engagement with the bearings 4 and the frames 1 by washers 8 mounted upon the lower ends of the stems and retained thereon by cotter pins 9.

The base of each lamp holder has a rearwardly extending arm 10 and pivotally connected to the ends of said arms, as at 11 is a connecting rod 12, whereby the lamp holders can be moved in unison.

Meshing with the beveled gear wheel 13 is a beveled sector gear 14 pivotally connected, as at 15 to a bearing 16, carried by the frame 1. The lower end of the sector-gear 14 is pivotally connected, as at 17 to a rearwardly extending angularly disposed reach-rod 18. This rod has the rear end thereof bent upwardly to provide a hand or foot piece 19, and adjacent to said piece, the top of the rod is toothed, as at 20.

The rear end of the rod extends through a guide 21, carried by the outer side of the frame 1, and said guide is provided with a rearwardly extending resilient locking member 22 having a tooth 23 to engage one of the teeth 20. The member 22 is adapted to hold the reach-rod 18 in an adjusted position and thereby lock the lamps or lanterns in the position to which they are adjusted by said rod.

The rear end of the reach-rod 18 can be moved by the heel or toe of the foot, or in some instances by hand and when shifted forwardly, the lamps or lanterns are turned in one direction and when moved rearwardly in the opposite direction.

It is thought that the operation and utility of the lamp adjusting mechanism will be apparent without further description, and while in the drawing there is illustrated a preferred embodiment of the invention, it is to be understood that the structural elements thereof are susceptible to such variations as fall within the scope of the appended claim.

What I claim is:—

In lamp adjusting mechanisms for automobiles, the combination with a shiftable lamp support including a beveled gear, of a pivotally connected vertically disposed sector gear permanently meshing with said beveled gear and provided with a depending arm, a forwardly extending and downwardly inclined reach rod pivotally connected at its forward end to the lower end of said arm and having its rear end provided with a vertically disposed foot piece, means for movably supporting the rear end of said rod, said rod having its rear end provided with teeth, and a rearwardly extending resilient locking member projecting from said means and adapted to engage said teeth for maintaining the rod in adjusted position.

In testimony whereof I affix my signature in the presence of two witnesses.

JOHN KOCHANOWSKI.

Witnesses:
 CHRISTINA T. HOOD,
 KARL H. BUTLER.